(12) United States Patent
Baxter

(10) Patent No.: US 7,240,921 B2
(45) Date of Patent: Jul. 10, 2007

(54) LANDING GEAR ASSEMBLY FOR A TRAILER

(75) Inventor: Bobby G. Baxter, Warrenton, MO (US)

(73) Assignee: Baxter Properties, L.L.C., Warrentaon, MO (US)

( * ) Notice: Subject to any disclaimer, the term of this patent is extended or adjusted under 35 U.S.C. 154(b) by 72 days.

(21) Appl. No.: 11/205,223

(22) Filed: Aug. 16, 2005

(65) Prior Publication Data

US 2006/0061078 A1    Mar. 23, 2006

Related U.S. Application Data

(62) Division of application No. 10/931,628, filed on Sep. 1, 2004.

(51) Int. Cl.
*B60P 1/00*   (2006.01)
*B60S 9/00*   (2006.01)
*B60S 9/02*   (2006.01)

(52) U.S. Cl. ............... 280/763.1; 280/6.153; 280/6.154; 280/764.1; 280/765.1; 280/766.1

(58) Field of Classification Search ......... 280/6.153, 280/6.154, 763.1, 764.1, 765.1, 766.1
See application file for complete search history.

(56) References Cited

U.S. PATENT DOCUMENTS

| | | | |
|---|---|---|---|
| 2,747,422 A | 5/1956 | Walther | |
| 2,885,220 A | 5/1959 | Dalton | |
| 3,259,364 A | 7/1966 | Hulverson et al. | |
| 3,632,086 A | 1/1972 | Mai | |
| 4,187,733 A | 2/1980 | Walther et al. | |
| 4,923,175 A | 5/1990 | Bentrup | |
| 5,199,738 A | 4/1993 | VanDenberg | |
| 5,238,266 A | 8/1993 | VanDenberg | |
| 5,238,268 A | 8/1993 | Logan | |
| 5,538,225 A | 7/1996 | VanDenberg | |
| 5,676,018 A | 10/1997 | VanDenberg | |
| 6,099,016 A | 8/2000 | Peveler | |
| 6,598,886 B2 | 7/2003 | Baird et al. | |
| 6,684,726 B2 | 2/2004 | Schmidt et al. | |
| 6,846,016 B2 | 1/2005 | VanDenberg et al. | |
| 2001/0054815 A1 | 12/2001 | Baird et al. | |

FOREIGN PATENT DOCUMENTS

EP     0 513 973     11/1992

OTHER PUBLICATIONS

Product Brochure for Jost Landing Gear.

(Continued)

*Primary Examiner*—Christopher P. Ellis
*Assistant Examiner*—John R. Olszewski
(74) *Attorney, Agent, or Firm*—Thompson Coburn LLP

(57) ABSTRACT

A landing gear assembly for supporting a trailer. The landing gear assembly having first and second legs and a connecting member. Each leg is configured to selectively extend and retract in length. The connecting member operatively connects the first and second legs and is rotatable about an axis relative to the trailer and is axially movable between a first position and a second position. The first and second legs are each configured to extend in length a first amount per revolution of the connecting member about the axis of the connecting member when the connecting member is in the first position. The first and second legs are each configured to extend in length a second amount per revolution of the connecting member about the axis of the connecting member when the connecting member is in the second position. The first amount is greater than the second amount.

18 Claims, 15 Drawing Sheets

OTHER PUBLICATIONS

Product Brochure for Eagle Landing Gear.
Product Brochure for Fruehauf Universal Mount Supports.
Product Brochure for Kwik Shift Constant Mesh Gearing.
Product Brochure for Holland Gooseneck Jack Technology.
Product Brochure for Holland 50000 Landing Gear.
Product Brochure for Holland 51000 Landing Gear.
Product Brochure for Holland FG4000 FastGear Landing Gear.
Product Brochure for Holland MARK V Landing Gear.
Product Brochure for Holland Formula 150 Series Landing Gear.

LANDING GEAR ASSEMBLY FOR A
TRAILER

This application is a divisional of application Ser. No. 10/931,628, filed on Sep. 1, 2004, which is currently pending.

FIELD OF THE INVENTION

The present invention generally is directed to an apparatus for supporting the front end of a trailer that has been detached from a truck, and more particularly to a landing gear assembly.

BACKGROUND OF THE INVENTION

One of the primary modes of shipping goods is by a truck pulled trailer. These trailers are equipped with a landing gear assembly that is retracted in a stored position above the ground while the trailer is coupled to the truck. The landing gear assembly allows the trailer to be uncoupled from the truck when necessary. After placing the trailer in a desired location, the operator lowers the landing gear assembly into contact with the ground. Once in contact with the ground, the truck is disengaged from the trailer. Loading the trailer or placing the landing gear assembly in contact with relatively soft ground may affect the trailer height above the ground. When the operator is ready to re-couple the trailer to a truck it may be necessary to extend the landing gear assembly to raise the trailer.

Two speed landing gear assemblies have been developed to allow the operator to more efficiently couple and uncouple trailers from trucks. A high gear mode allows the landing gear assembly to move rapidly between the stored position and the ground. Once in contact with the ground, the low gear mode allows the landing gear assembly to lift the trailer. The operator turns a crank to raise or lower the landing gear assembly. The ratio of crank turns per inch of travel of the landing gear assembly is smaller for the high gear than for the low gear. In other words, the legs will extend more per turn of the crank in high gear than in low gear. Some two speed landing gear assemblies include a gear box attached to one of the legs of the landing gear assembly. An input shaft turns an output shaft via the gears contained in the gear box. The output shaft interacts with the lifting mechanism in both legs of the landing gear assembly to extend or retract the legs. In this configuration, the leg having the gear box functions as a master leg and the other leg functions as a slave leg.

Current landing gear assemblies split the mechanical advantage (created by the gear box) between the two legs. As a result, relatively large forces are placed on the lifting mechanism in each leg and the cross bar between the two legs which affects the service life of the landing gear assembly. Another drawback of current landing gear assemblies is that the operator can only extend and retract the legs in high and low gears from the master leg location. Still another limitation of current landing gear assemblies is that a single set of legs cannot be mounted in the multiple configurations required by the different types of trailers.

SUMMARY OF THE INVENTION

The present invention solves these problems, providing a new landing gear assembly that eliminates the master and slave arrangement of the previous landing gear assemblies and allows operation of the assembly from either side of the trailer. In addition, the modular nature of the new landing gear assembly allows a single configuration to be used in both legs by changing the location of the mounting plate. In addition, a set of legs may be mounted in any configuration required by the different types of trailers.

One aspect of the present invention is a landing gear assembly for supporting a trailer. The landing gear assembly comprises a first leg, a second leg, and a cross shaft. Each leg has a housing, an input shaft, a gear mechanism, and an extension portion. The housing is adapted to connect the leg to a trailer. The input shaft has a first end portion and a second end portion. The input shaft extends through the housing and is axially movable between a first position and a second position and is rotationally movable. The gear mechanism is housed in the housing and has a high gear and a low gear. The gear mechanism is operatively connected to the input shaft such that the input shaft engages the low gear when in the first position and the input shaft engages the high gear when in the second position. The extension portion is telescopically movable with respect to the housing and is operatively connected to the gear mechanism such that rotation of the input shaft moves the extension portion with respect to the housing. The extension portion is movable a first distance when the input shaft is rotated one revolution while in the first position and a second distance when the input shaft is rotated one revolution while in the second position. The second distance is greater than the first distance. The cross shaft is adapted to operatively connect a first end portion of one of the input shafts with a second end portion of the other of the input shafts such that axial movement of one of the input shafts of the first and second legs causes axial movement of the other of the input shafts of the first and second legs and rotation of one of the input shafts of the first and second legs causes rotation of the other of the input shafts of the first and second legs. The first and second legs are adapted to be attached to a trailer and connected to one another with the cross shaft such that when the input shaft of one of the first and second legs is moved to the first position the input shaft of the other of the first and second legs is moved to the first position and when the input shaft of one of the first and second legs is moved to the second position the input shaft of the other of the first and second legs is moved to the second position and when the input shaft of one of the first and second legs is rotated one revolution the input shaft of the other of the first and second legs is rotated one revolution.

Another aspect of the present invention is a trailer having a landing gear assembly. The landing gear assembly comprises first and second legs and a connecting member. The first and second legs are attached to the trailer and each leg is configured to selectively extend and retract in length. The connecting member operatively connects the first and second legs and is rotatable about an axis relative to the trailer and is axially movable between a first position and a second position. The first and second legs are each configured to extend in length a first amount per revolution of the connecting member about the axis of the connecting member when the connecting member is in the first position. The first and second legs are each configured to extend in length a second amount per revolution of the connecting member about the axis of the connecting member when the connecting member is in the second position. The first amount is greater than the second amount.

Another aspect of the present invention is a landing gear assembly comprising a first leg that is adapted to attach to a trailer. The first leg includes a first housing, a first input shaft, a first gear mechanism, and a first extension portion. The first input shaft has a first end portion opposite a second end portion and extends through the first housing and is rotatable about a first axis relative to the first housing and is axially movable between a first position and a second position. The first gear mechanism has a first high gear and a first low gear and is operatively connected to the first input shaft such that the first input shaft engages the first low gear when in the second position and the first input shaft engages the first high gear when in the first position. The first extension portion is telescopically movable with respect to the first housing and is operatively connected to the first gear mechanism such that rotation of the first input shaft moves the first extension portion with respect to the first housing. The first extension portion is movable a first amount when the first input shaft is rotated one revolution while in the first position and is movable a second amount when the first input shaft is rotated one revolution while in the second position. The first amount is greater than the second amount. The first leg is adapted and configured to operatively connect to a second leg similar to the first leg and to be attached to a trailer in a manner such that axial movement of the input shaft selectively engages the high and low gears of the first and second legs.

Another aspect of the present invention is a method of extending a landing gear assembly. The method includes providing a trailer having the landing gear assembly. The landing gear assembly has first and second legs attached to the trailer and a connecting member operatively connecting the first and second legs. Each leg is configured to selectively extend and retract in length. The connecting member is rotatable about an axis relative to the trailer. The method further comprises causing the connecting member to rotate about the axis of the connecting member at a first rate such that the first and second legs extend in length a first amount per revolution of the connecting member. The method further comprises causing the connecting member to rotate about the axis of the connecting member at the first rate such that the first and second legs extend in length a second amount per revolution of the connecting member. The first amount is greater than the second amount.

Other features and advantages will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENTS

Figure 1:
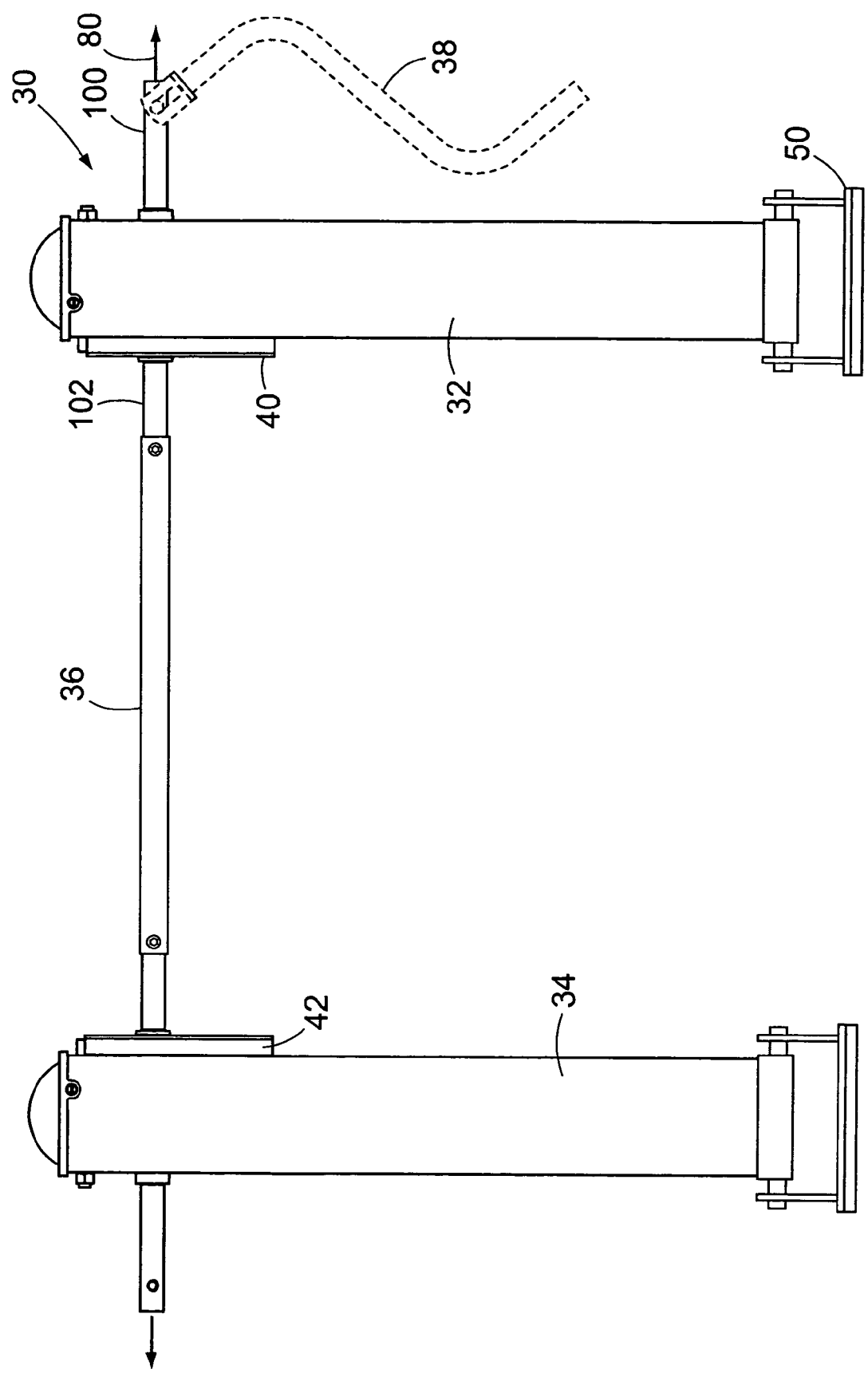
FIG. 1 is a front plan view of a landing gear assembly of the present invention.

Referring now to the drawings, and more particularly to FIG. 1 a front plan view of a landing gear assembly is shown generally at 30. The landing gear assembly comprises a first leg 32, a second leg 34, and a connecting member 36. In the embodiment shown, the connecting member is a connecting shaft that is cylindrical. The first and second legs are configured to selectively extend and retract in length. A crank 38 may by attached to the landing gear assembly and operated to extend and retract the legs. The first leg 32 includes a first mounting plate 40 and the second leg 34 includes a second mounting plate 42. As will be discussed in more detail below, the relative location of a mounting plate on a leg is the only structural difference between the first and second legs of a landing gear assembly. The mounting plates allow the legs to attach to a trailer in a known manner.

Figure 2:
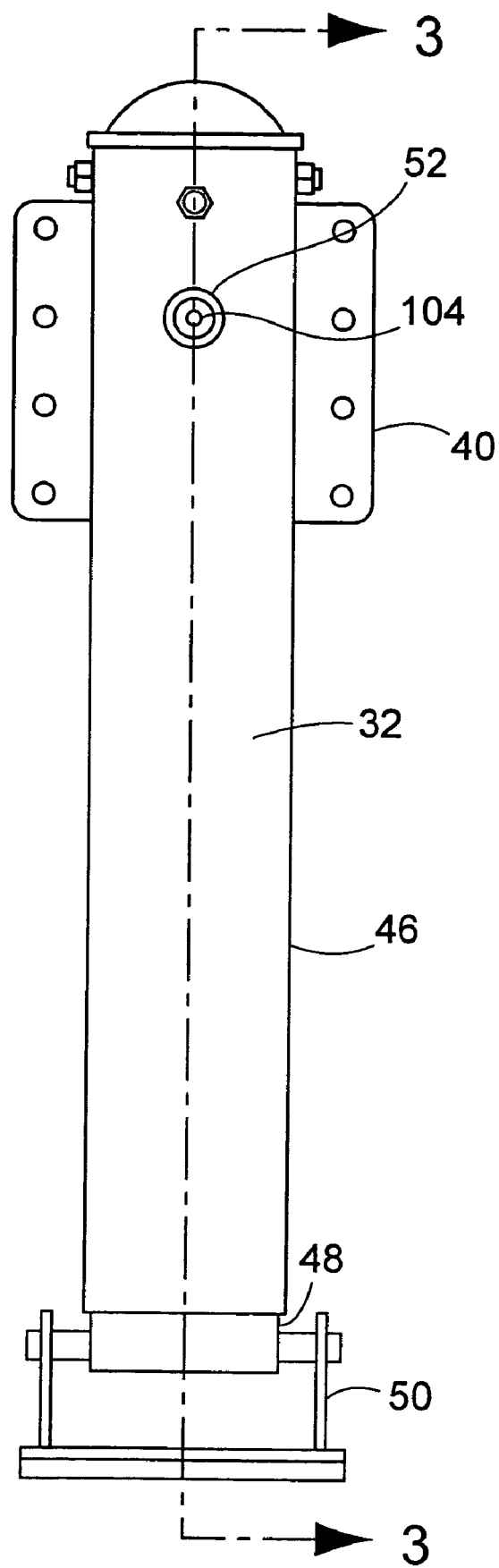
FIG. 2 is a side plan view of a leg of the landing gear assembly of FIG. 1.
Figure 3:
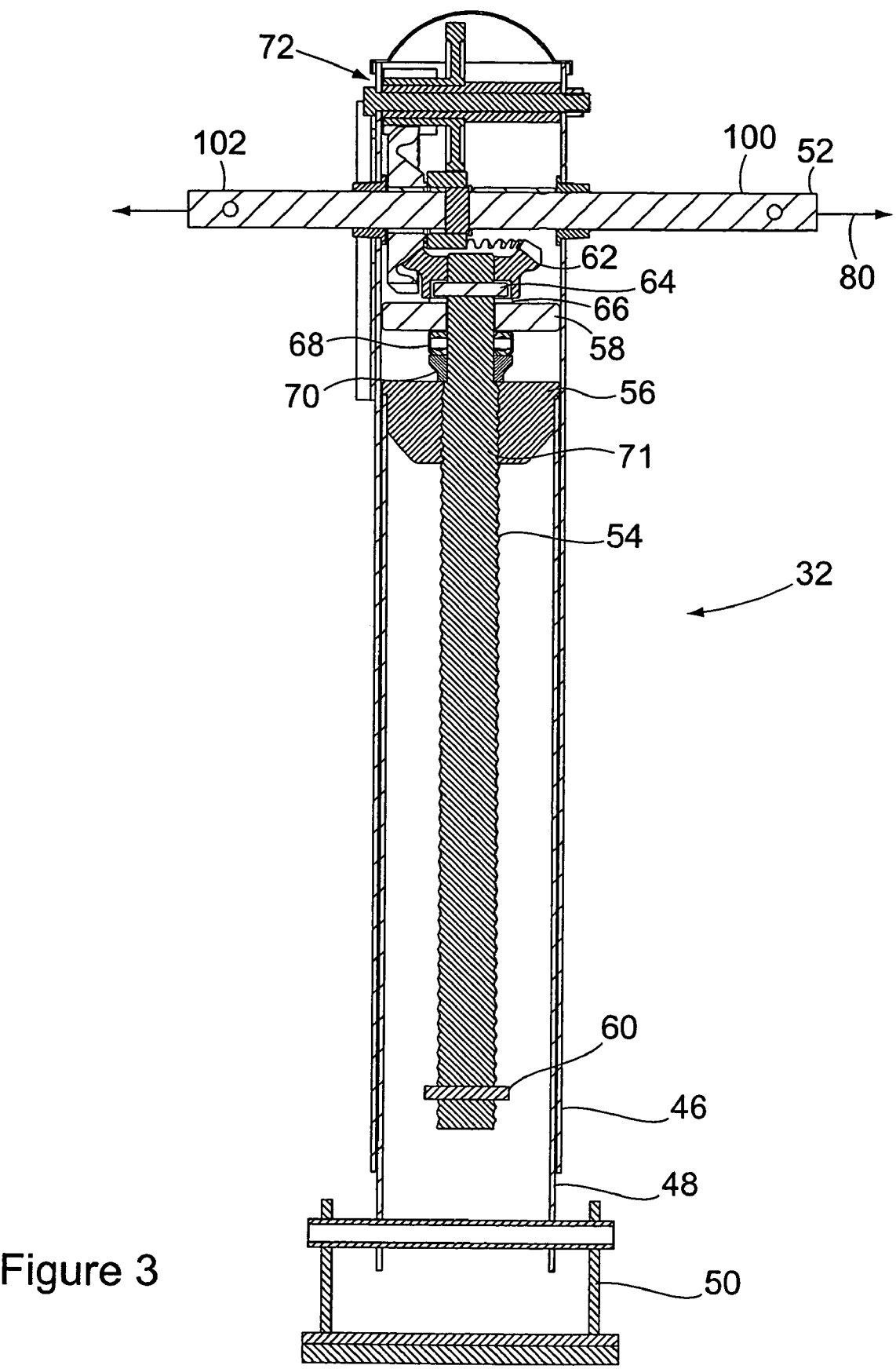
FIG. 3. is a sectional view taken along line 3-3 of FIG. 2.

Referring now to FIGS. 2 and 3, FIG. 2 shows a side plan view of the first leg 32 of the landing gear assembly 30 of FIG. 1. FIG. 3 shows a sectional view of the first leg 32 taken along line 3-3 in FIG. 2. The first leg 32 comprises a housing 46, an extension portion 48, a shoe 50, and an input shaft 52. The housing 46 is sized and configured to receive the extension portion 48 such that the extension portion is telescopically movable with respect to the housing 46. The movement of the extension portion with respect to the housing is controlled by a lifting mechanism.

The lifting mechanism comprises an externally threaded screw 54, a riser nut 56, a stop plate 58 and a limit post 60. The stop plate 58 is fixed within the housing 46 and defines an opening that is sized to receive the screw 54 in a manner such that the screw is free to rotate within the housing. A bevel gear 62 is sized and configured to engage a portion of the screw 54. The bevel gear 62 is further sized and configured to engage a set pin 64 extending from the screw. The set pin 64 and a flat washer 66 on a first side of the stop plate 58 and a thrust bearing 68 and locking member 70 on a second side of the stop plate 58 prevent axial movement of the screw 54 within the housing 46 while allowing the screw 54 to freely rotate. The riser nut 56 is fixed to the extension portion 48 and the riser nut defines an internally threaded central bore that is sized and configured to engage the external threads of the screw 54. Rotation of the screw 54 causes the riser nut 56 to move axially along the screw. Movement of the riser nut 56 along the screw 54 is limited by the locking member 70 and the thrust bearing 68 on one end and the limit post 60 on the other end. As the screw 54 is rotated and the riser nut 56 is moved along the screw in the direction of the limit post 60 the extension portion 48 is extended from the housing 46. In the alternative, as the screw 54 is rotated and the riser nut 56 is moved along the screw in the direction of the locking member 70 the extension portion 48 is retracted into the housing 46. When the riser nut 56 abuts the locking member 70, the leg is in a fully retracted condition and when the riser nut abuts the limit post 60, the leg is in a fully extended condition.

Figure 4A:
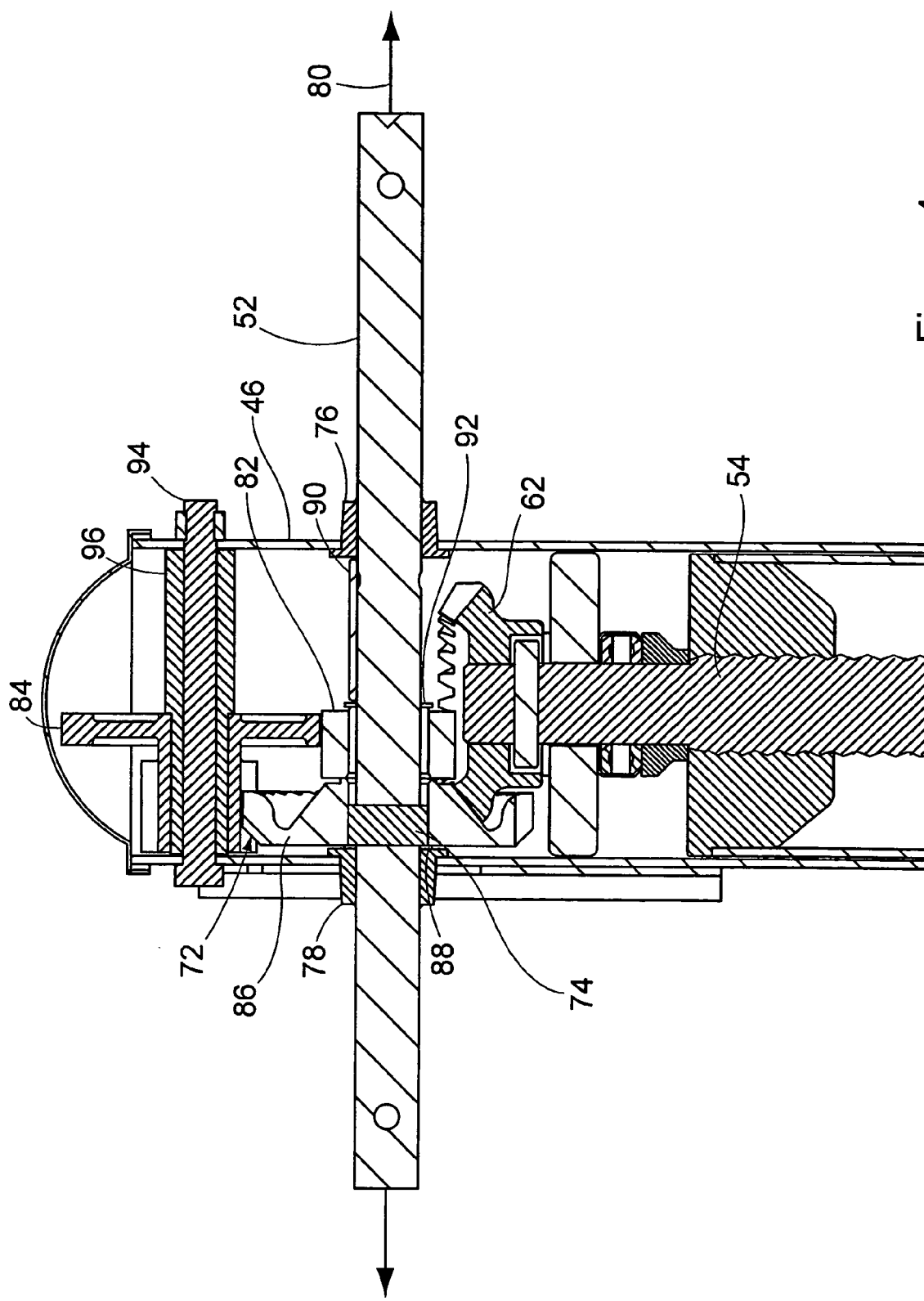
FIG. 4*a* is a top portion of the sectional view of FIG. 3 with the device in a first condition.
Figure 4B:
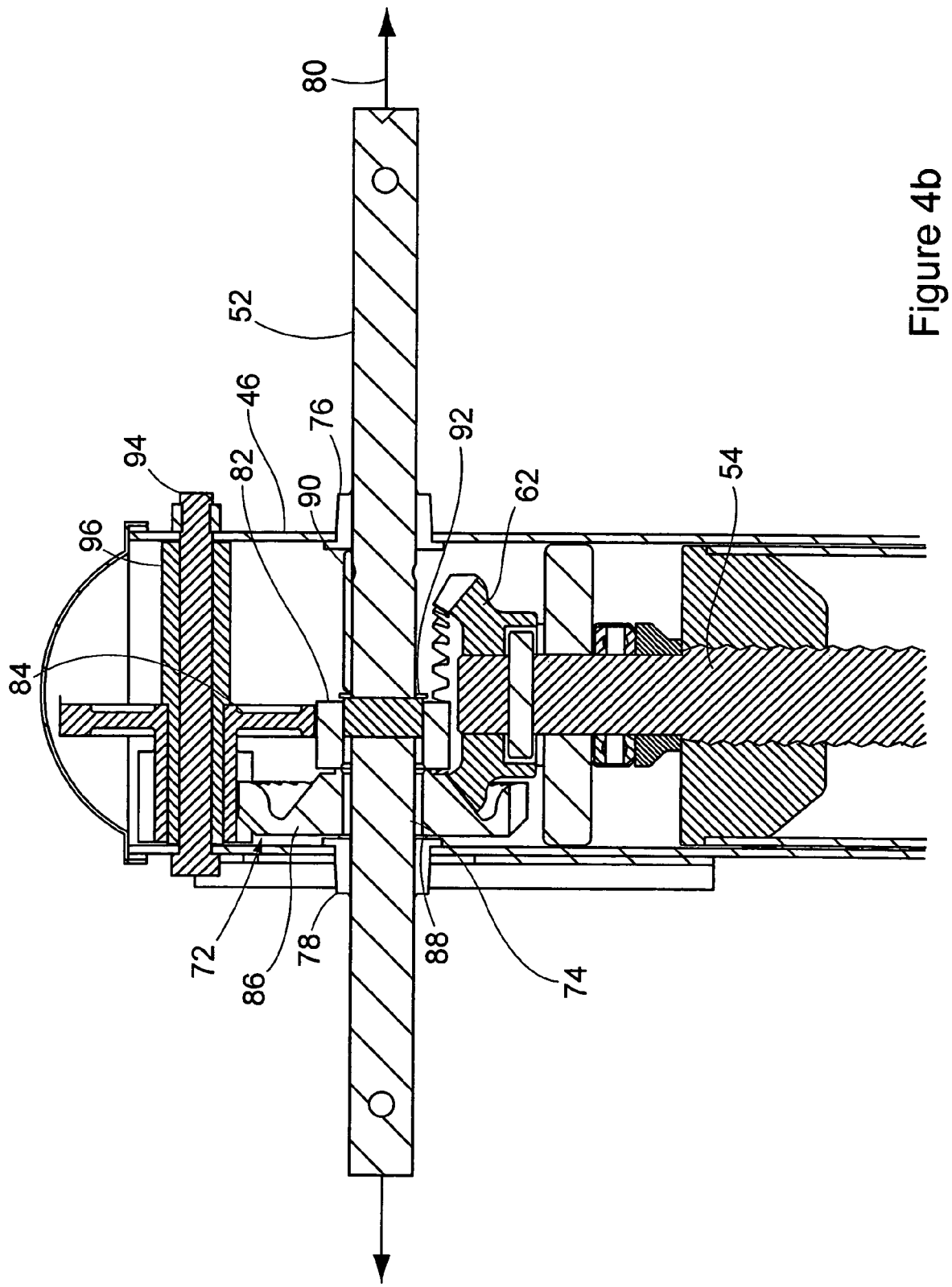
FIG. 4*b* is a top portion of the sectional view of FIG. 3 with the device in a second condition.

A gear mechanism is shown generally at 72 in FIGS. 3, 4a and 4b. The gear mechanism engages the bevel gear 62. A shift key 74 provides an interface between the input shaft 52 and the gear mechanism 72. The housing 46 defines a first opening opposite a second opening. The first opening is sized to receive a first bushing 76 and the second opening is sized to receive a second bushing 78. The first and second bushings are sized to receive the input shaft 52 and configured to allow rotation of the input shaft about an input shaft axis 80 with respect to the housing 46. The first and second bushings are further configured to allow axial movement of the input shaft in a direction of the input shaft axis 80.

The gear mechanism 72 comprises a low input gear 82, an idler gear 84 and a high input gear 86. The low input gear 82 and the high input gear 86 are sized and configured to receive the input shaft 52. A first input washer 88 is located adjacent the high input gear 86. A shift retainer 90 positions a second input washer 92 adjacent the low input gear 82. The shift retainer 90 is partially cylindrical in shape (having a c-shaped cross section) and is configured to snap over the input shaft 52. The first and second input washers 88,92 and the shift retainer 90 fix the position of the low input gear 82 and the high input gear 86 between the first and second bushings 76,78. An idler shaft 94 is located parallel to the input shaft 52 and fixed in the housing 46. An idler shaft tube 96 is sized to fit on the idler shaft 94 and to receive and position the idler gear 84. The idler shaft tube 96 is configured such that the idler gear 84 may rotate about the idler shaft 94 and engage both the low input gear 82 and the high input gear 86.

Referring now to FIGS. 4a and 4b, operation of the gear mechanism 72 can be seen in a high gear condition and a low gear condition respectively. In FIG. 4a, the input shaft 52 is in a first axial position. In the first axial position, the shift key 74 is adjacent the first input washer 88 and in engagement with the high input gear 86. Rotation of the input shaft 52 causes the high input gear 86 to directly engage the bevel gear 62 and to transfer the rotation of the input shaft 52 to the screw 54 at a first ratio. In FIG. 4b the input shaft 52 is in a second axial position. In the second axial position, the shift key 74 is adjacent the second input washer 92 and in engagement with the low input gear 82. Rotation of the input shaft 52 causes the low input gear 82 to engage the idler gear 84 which in turn engages the high input gear 86. Rotation of the input shaft 52 is transferred by the shift key 74 to the low input gear 82 to the idler gear 84 to the high input gear 86 to the bevel gear 62 and finally to the screw 54 at a second ratio. Axial movement of the input shaft 52 is limited by the first and second input washers 88, 92.

Figure 5:
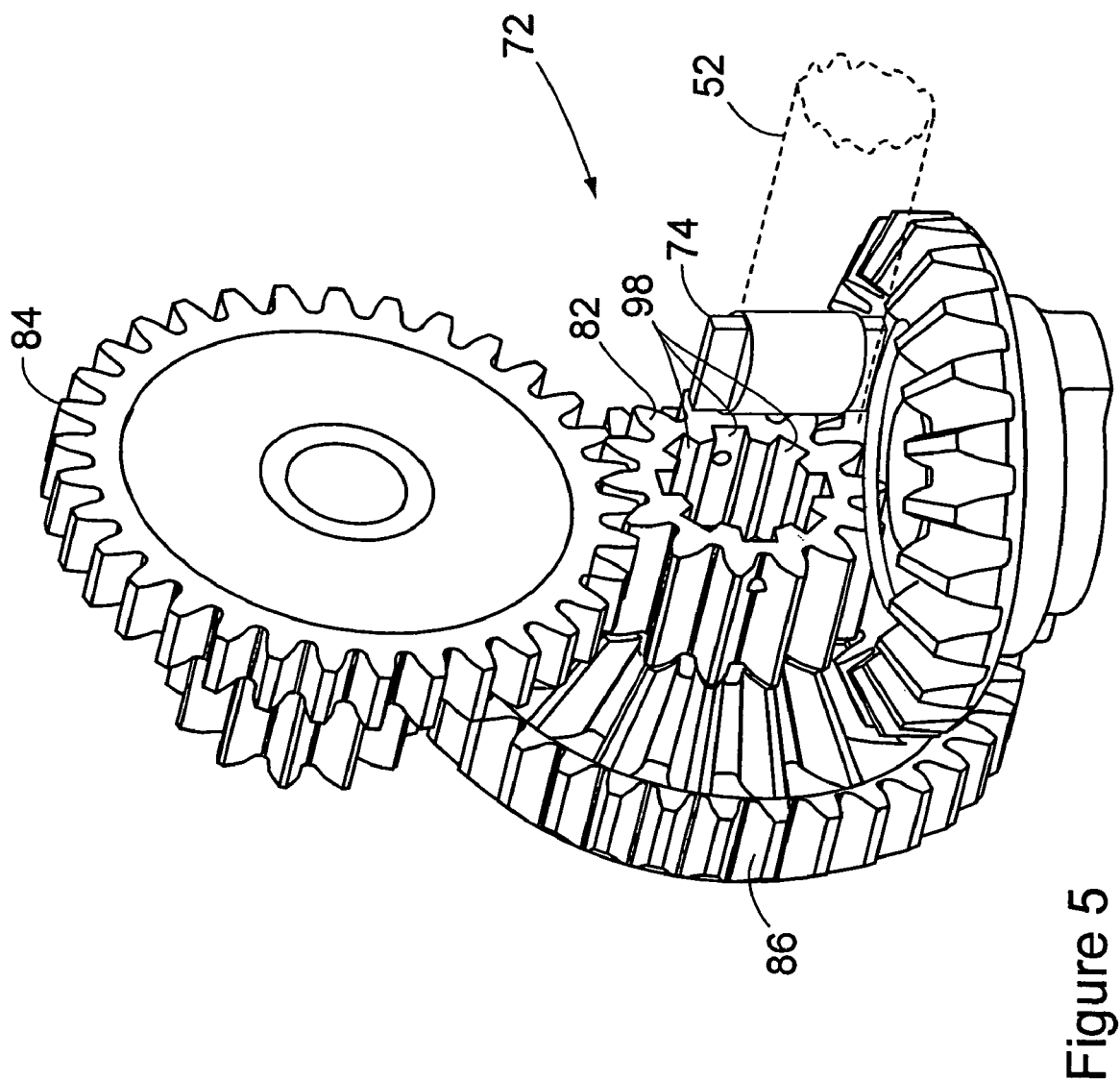
FIG. 5 is an exploded view of the gear mechanism of FIG. 2.

Referring now to FIG. 5, an exploded view of the gear mechanism 72 and the shift key 74 can be seen. The input shaft 52 is shown in shadow for clarity. The low input gear 82 and the high input gear 86 have a plurality of shift key channels 98 that are shaped and configured to receive the shift key 74. The high input gear 86 and low input gear 82 are free to rotate about the input shaft 52 when not engaged by the shift key 74. For example, in FIG. 4a, the shift key 74 directly engages the high input gear 86 which transfers rotation of the input shaft 52 to the screw 54. At the same time, the high input gear is also causing the idler gear 84 and the low input gear 82 to freely rotate. When the input shaft 52 is in a position between the first and second positions, the shift key 74 may engage both the low input gear 82 and the high input gear 86 and in this position, the input shaft 52 will not rotate. The input shaft 52 will rotate when the shift key is in engagement with only one of the high and low input gears.

Figure 6:
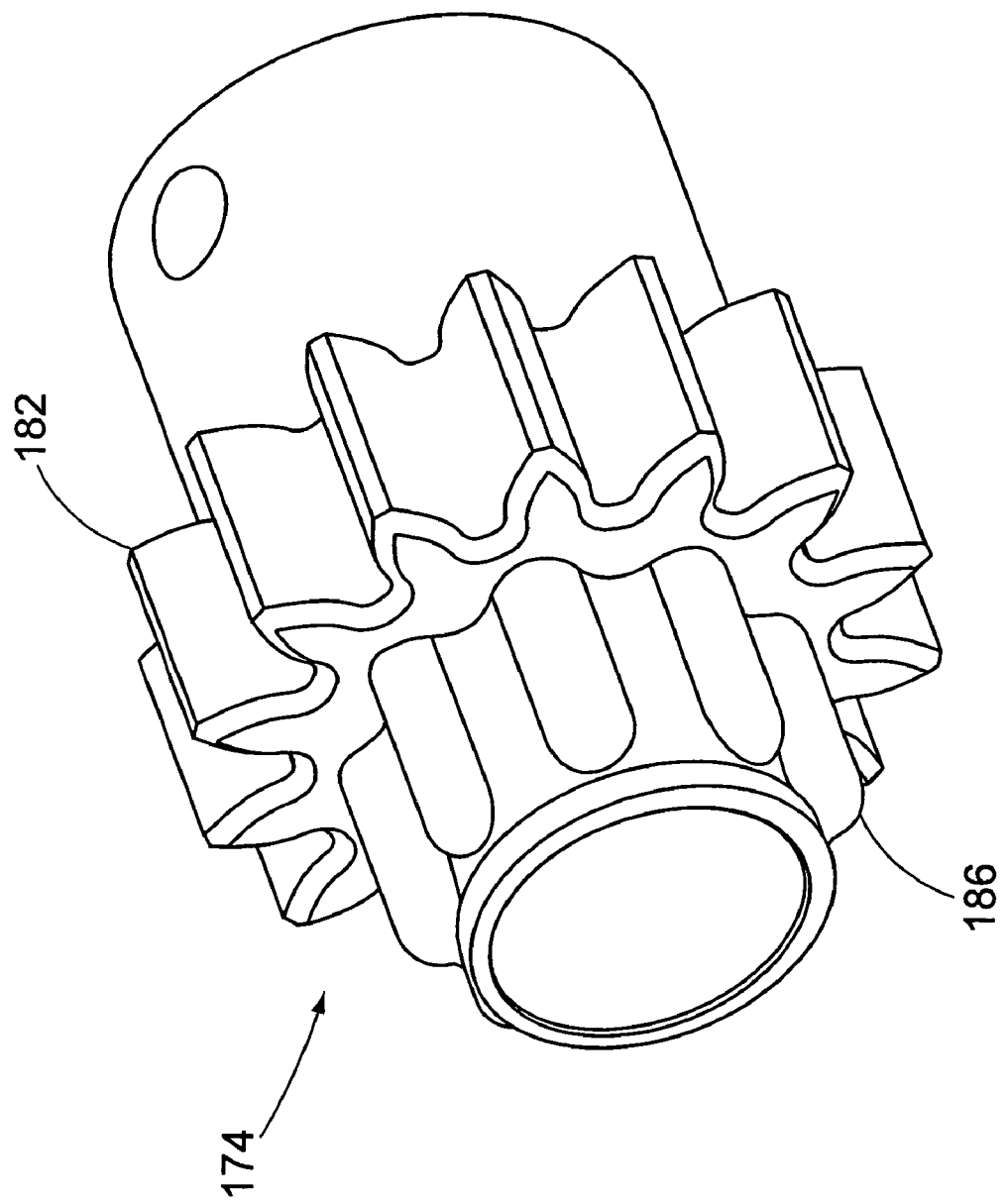
FIG. 6 is another embodiment of the shift key.

Referring now to FIG. 6, an alternative embodiment of the shift key is shown generally at 174. In this alternative embodiment, the shift key 174 includes a low gear cog portion 182 and a high input gear engaging portion 186. The low gear cog portion 182 will replace the low input gear 82. In the first axial position, the high input gear engaging portion 186 will be engaged with the high input gear 86 and the low gear cog portion 182 will not be engaged with the idler gear 84. In the second axial position, the high input gear engaging portion 186 will not be engaged with the high input gear 86 and the low gear cog portion 182 will be engaged with the idler gear 84.

Figure 7:
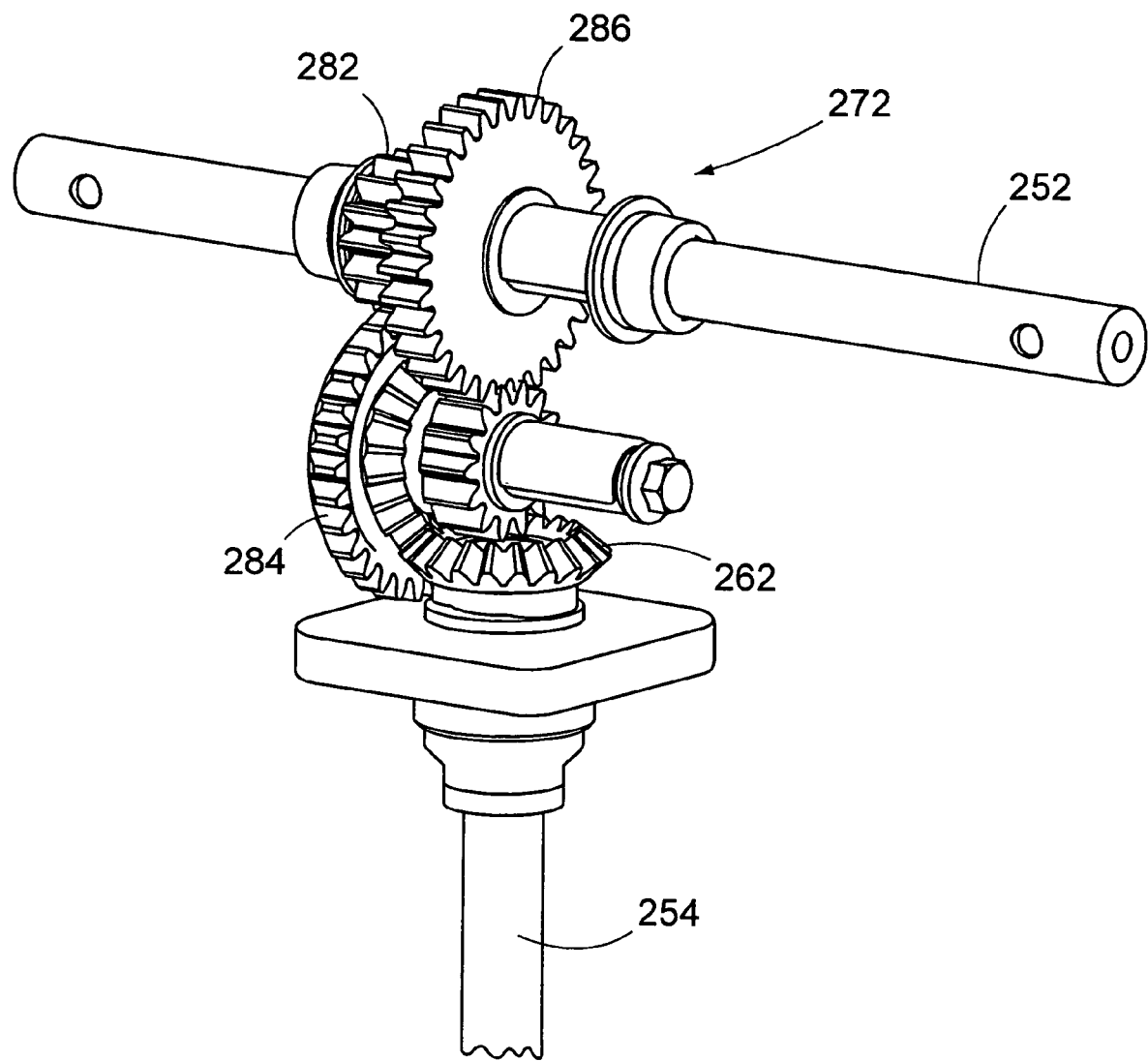
FIG. 7 is a perspective view, without the housing for purposes of clarity, of an upper portion of a leg of a landing gear assembly of the present invention.
Figure 8:
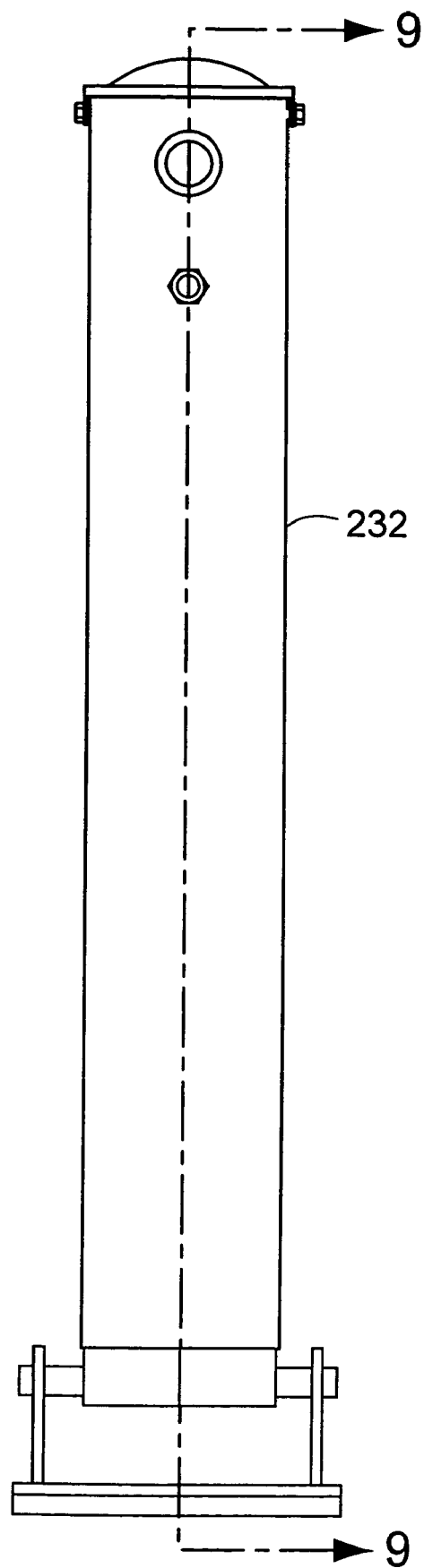
FIG. 8 is a side plan view of the leg of FIG. 7.
Figure 9:
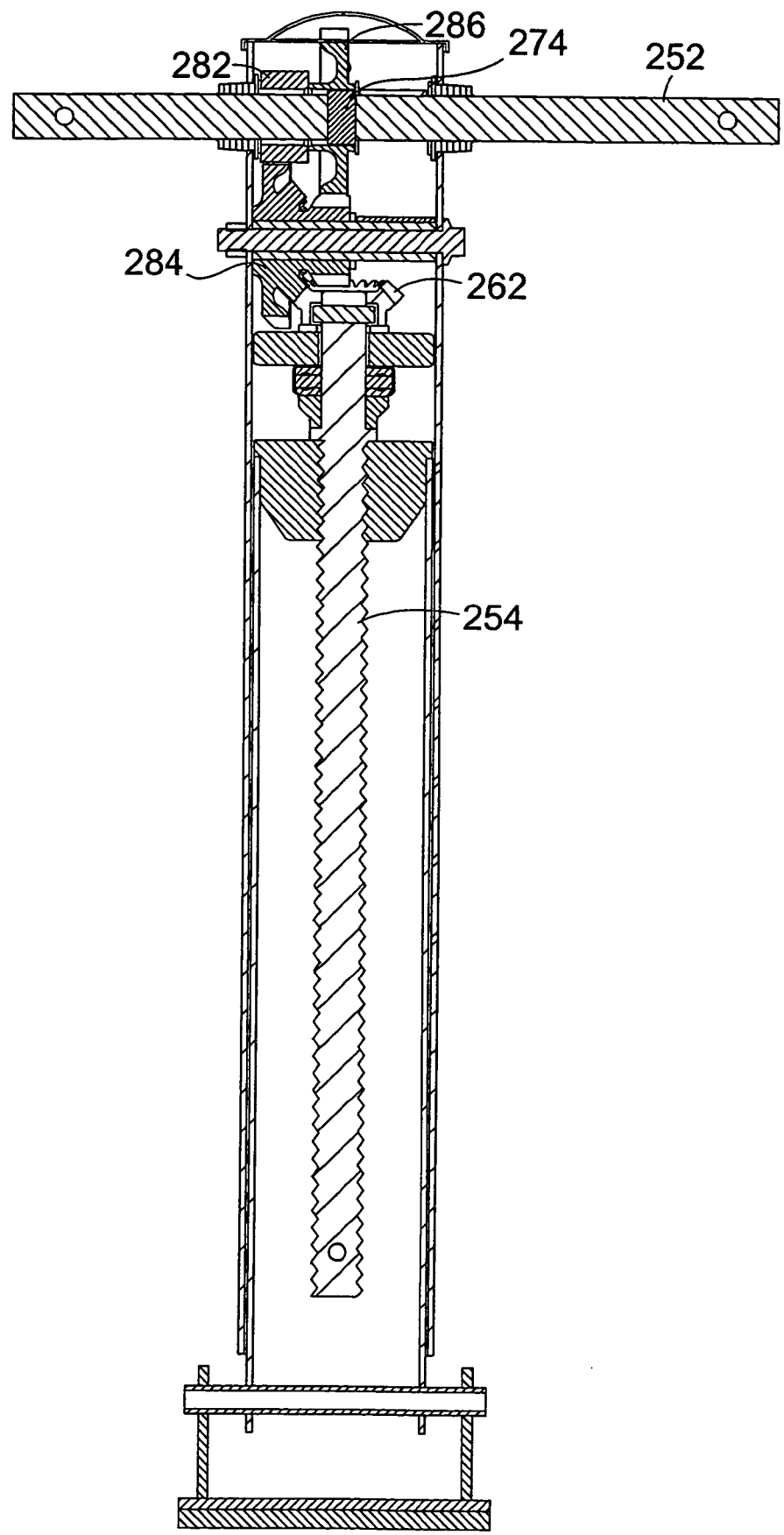
FIG. 9 is a sectional view taken along line 9-9 in FIG. 8.

Referring now to FIGS. 7-9, FIG. 7 is a perspective view of a another embodiment of a gear mechanism 272. FIG. 8 is a side plan view of a leg 232 housing the gear mechanism 272 of FIG. 7. FIG. 9 is a sectional view taken along line 9-9 in FIG. 8. A high input gear 286 and a low input gear 282 are selectively engaged by the shift key 274 as previously described. An idler gear 284 engages the high input gear 286 and the low input gear 282. A bevel gear 262 engages the idler gear 284. In the first axial position (shown in FIG. 9) the shift key 274 engages the high input gear 286 and rotation of an input shaft 252 directly engages the high input gear 286 which engages the idler gear 284 which engages the bevel gear 262 transferring the rotation of the input shaft 252 to a screw 254 at a first ratio. In the second axial position (not shown) the shift key engages the low input gear 282 and rotation of the input shaft 252 directly engages the low input gear 282 which engages the idler gear 284 which engages the bevel gear 262 transferring rotation of the input shaft 252 to the screw 254 at a second ratio.

Figure 10:
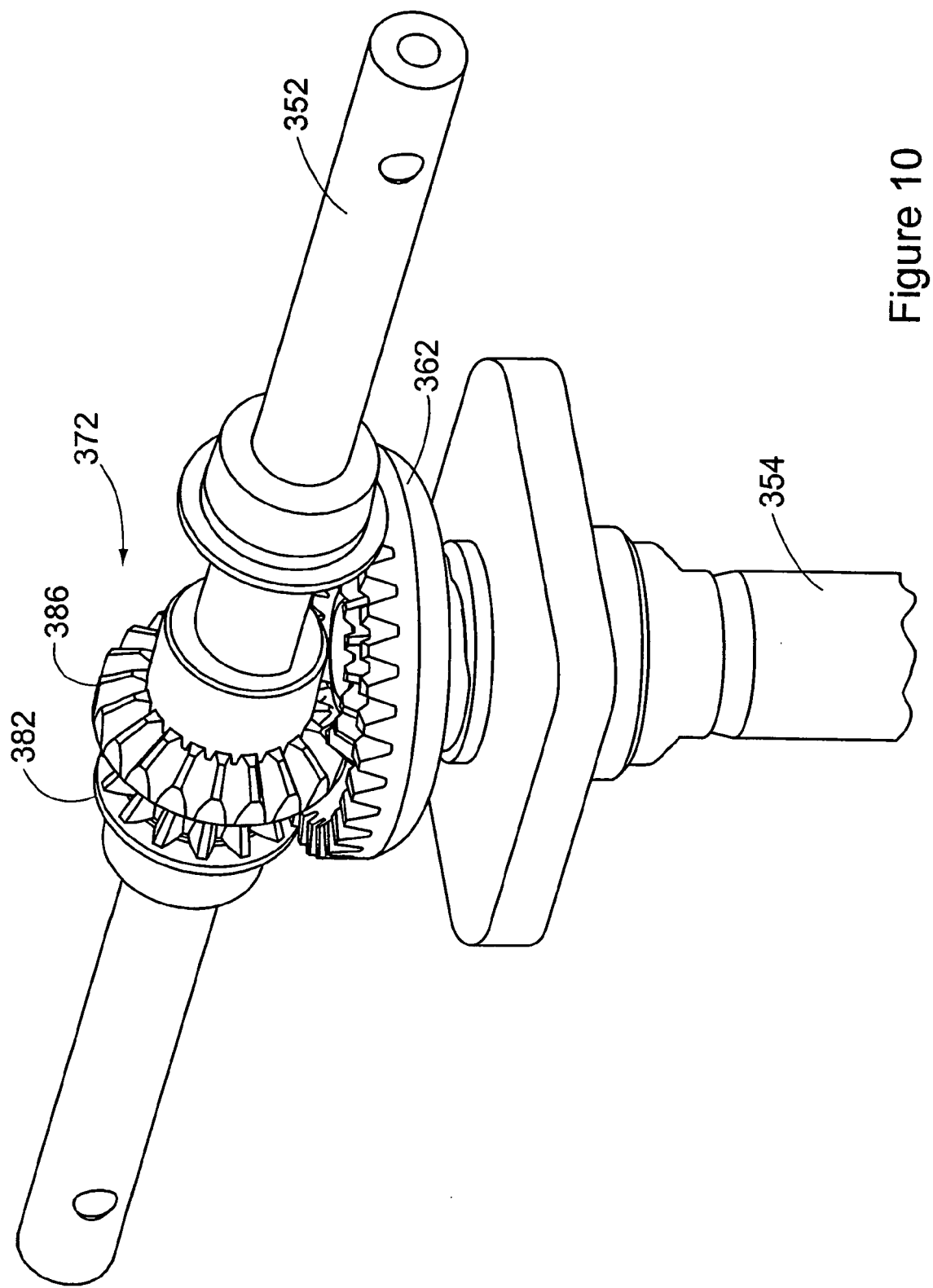
FIG. 10 is a perspective view, without the housing for purposes of clarity, of an upper portion of a leg of a landing gear assembly of the present invention.
Figure 11:
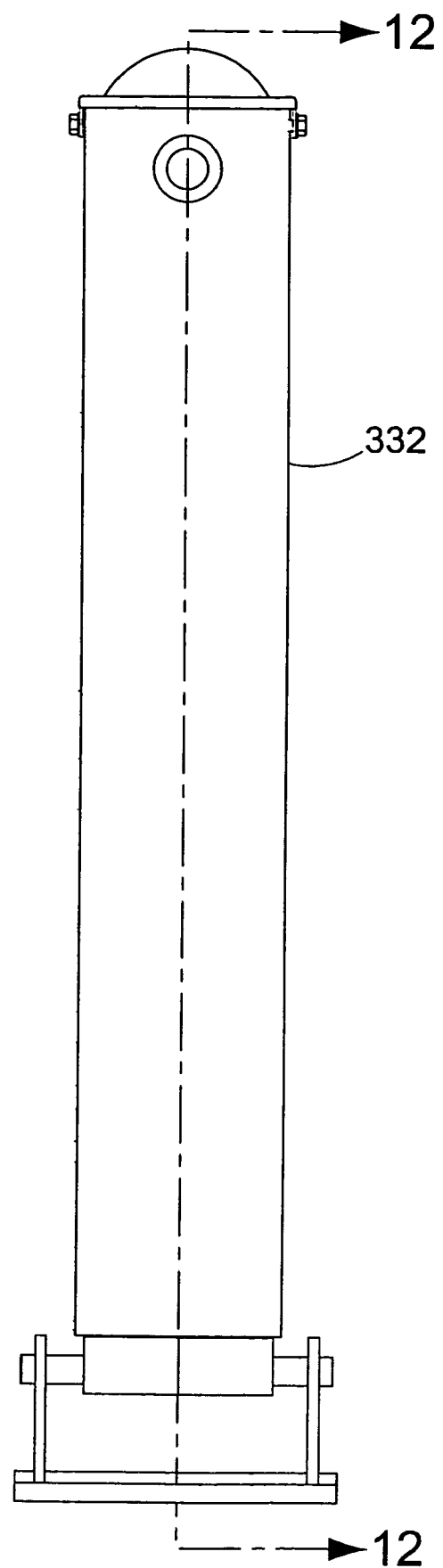
FIG. 11 is a side plan view of the leg of FIG. 10.
Figure 12:
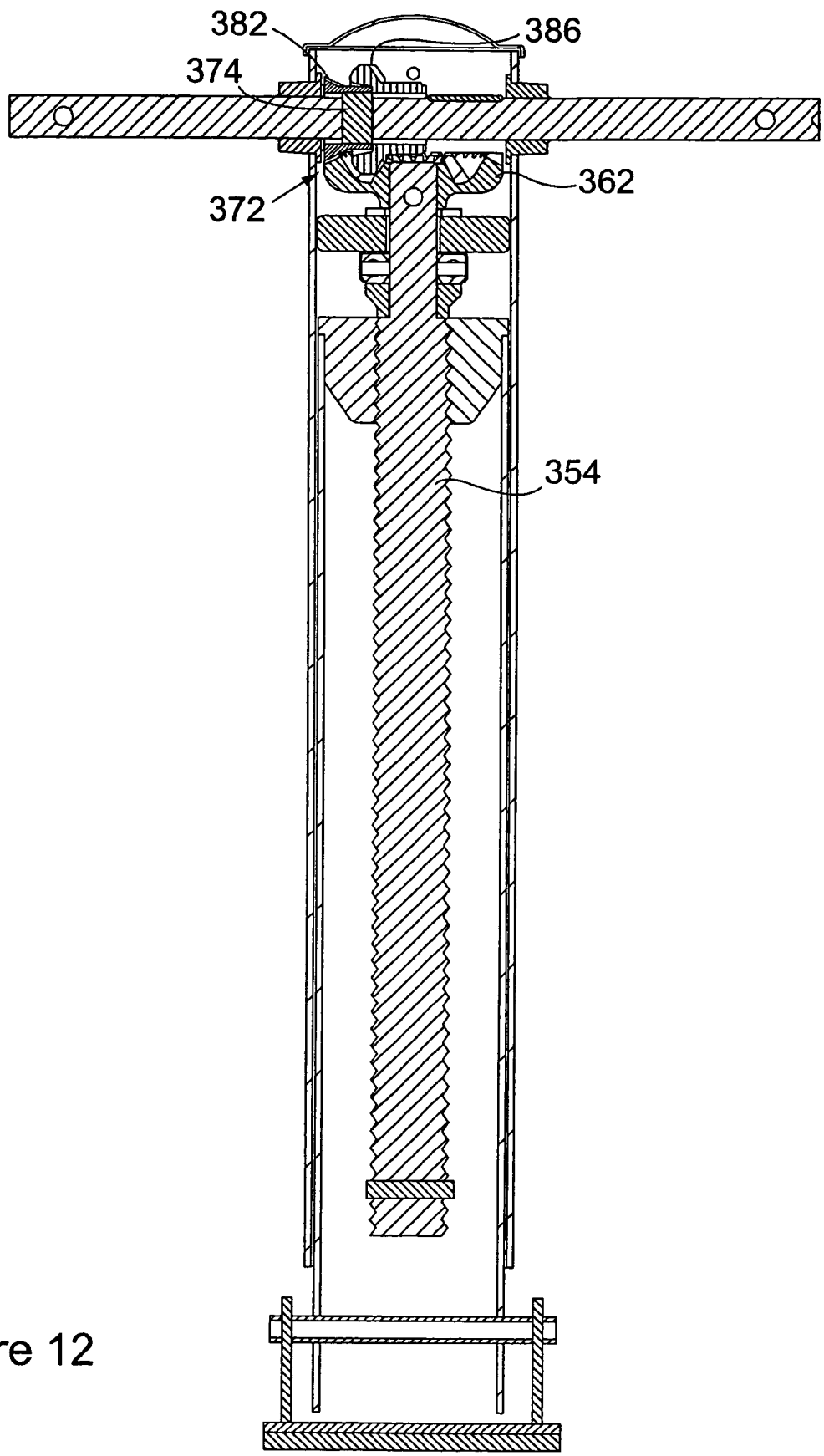
FIG. 12 is a sectional view taken along line 12-12 in FIG. 11.

Referring now to FIGS. 10-12, FIG. 10 is a perspective view of another embodiment of a gear mechanism 372. FIG. 11 is a side plan view of leg 332 housing the gear mechanism 372 of FIG. 10. FIG. 12 is a sectional view taken along line 12-12 in FIG. 11. A high input gear 386 and a low input gear 382 are selectively engaged by the shift key 374 as previously described. A bevel gear 362 engages the high input gear 386 and the low input gear 382. In the first axial position (not shown) the shift key 374 engages the high input gear 386 such that rotation of an input shaft 352 directly engages the high input gear 386 which engages the bevel gear 362 which transfers the rotation of the input shaft 352 to a screw 354 at a first ratio. In the second axial position (shown in FIG. 12) the shift key 374 engages the low input gear 382 such that rotation of the input shaft 352 directly engages the low input gear 382 which engages the bevel gear 362 which transfers rotation of the input shaft 352 to the screw 354 at a second ratio.

The various embodiments of the gear mechanism allow a selection of high/low gear configurations. These allow the legs to be extended at a variety of first and second ratios.

Referring back to FIGS. 1-3, the input shaft 52 has a first end portion 100 opposite a second end portion 102. Indicia 104 located on the first end portion 100 of the input shaft 52 indicates the direction of input shaft travel necessary to engage the low and high gear portions of the gear mechanism. In the embodiment shown, movement of the input shaft 52 in a direction from the first end portion 100 toward the second end portion moves the input shaft towards engagement with the high gear portion of the gear mechanism 72. The indicia could also be any type of indicia. For example the words "push in=high gear" placed on the outside of the housing could be used to indicate the direction of the high gear position.

Figure 13A:
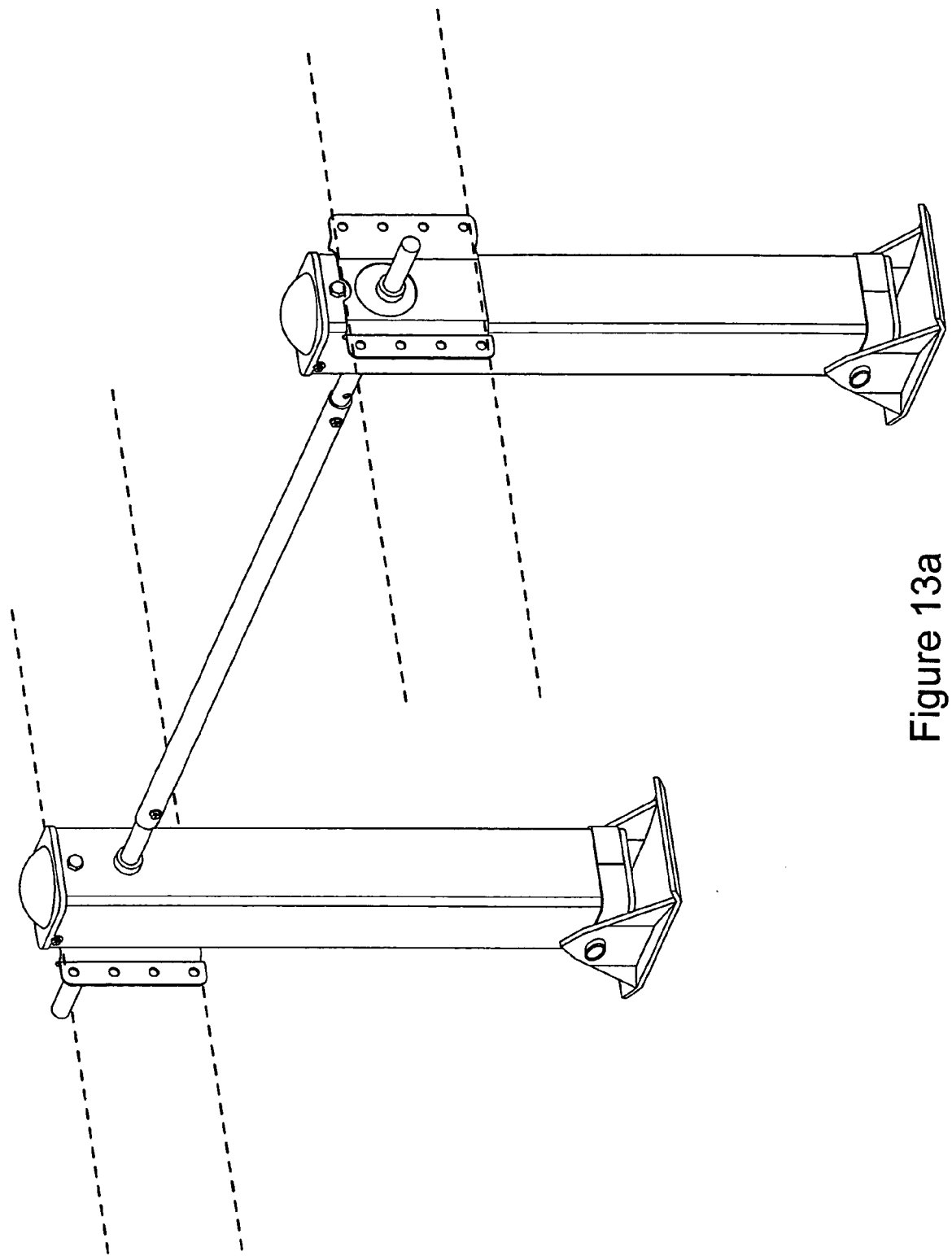
FIG. 13*a* is a landing gear assembly of the present invention shown in a first mounting configuration.
Figure 13B:
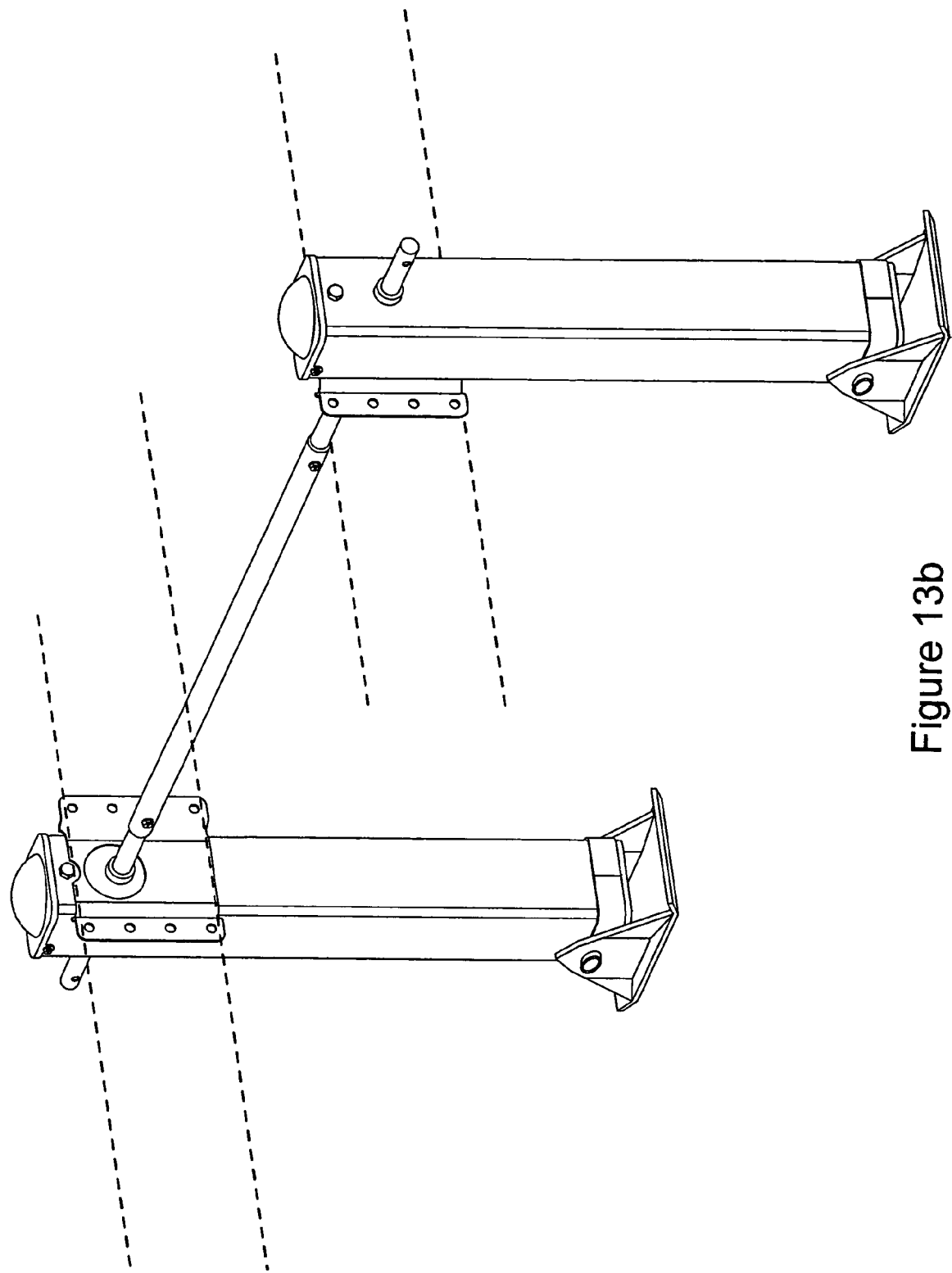
FIG. 13*b* is the landing gear assembly of FIG. 13 shown in a second mounting configuration.

Each landing gear assembly includes first and second legs. As described above the first and second legs are the same. The only difference between the first and second legs in a landing gear assembly is the location of the mounting brackets. The first mounting bracket is located on the first leg on a side adjacent the second end portion 102 of the input shaft 52. The second mounting bracket is located on the second leg on a side adjacent the first end portion 100 of the input shaft. Mounting options for landing gear include location and position. Location refers to a conventional mount or a reverse mount. A regular trailer has the support rails located closer to the outside of the trailer and the landing gear is mounted in a reverse mount as shown in FIG. 13*a*. A flat-bed trailer has supporting rails closer to the centerline and the landing gear is mounted in a conventional mount as shown in FIG. 13*b*. The landing gear position refers to roadside or curbside cranking and corresponds to where an operator will operate the attached crank to extend or retract the landing gear assembly.

It should be understood that the landing gear assembly may be attached to a trailer such that operation of the landing gear assembly is consistent with the experience of the operator. For example, most landing gear assemblies are set up such that clockwise rotation of the crank extends the legs and counter-clockwise rotation of the crank retracts the legs. In addition, most landing gear assemblies are set up such that the operator engages the high gear by pushing the crank axially "in" while the low gear is engaged by pulling the crank axially "out". Some operators prefer to have the crank located on one side of the trailer while others prefer it on the other side of the trailer. For purposes of discussion, roadside and curbside correspond to the side of the trailer adjacent the road and the curb respectively when the trailer is on the side of a road but do not require that the trailer be located on the side of a road. For a landing gear assembly mounted in a curbside location, an operator would attach a crank to the landing gear assembly on the curb side of the trailer such that clockwise rotation of the crank extends the legs and counter-clockwise rotation of the crank retracts the legs and axially movement of the crank toward the trailer engages the high gear and axially movement of the crank away from the trailer engages the low gear.

As described below, the landing gear assembly can be mounted to any trailer in any position and any location. The set includes first and second legs and at least one connecting member. The connecting member can include a removable portion to adjust for the shorter distance between the first and second legs when mounted on the inside of the rails. In the alternative, the set can include two connecting members (one to be used with mounting gear mounted in a conventional mount and one to be used with mounting gear mounted in a reverse mount).

The landing gear assembly can be attached to a new trailer. The landing gear assembly can also be used to replace a worn landing gear assembly on an existing trailer. To install, the first and second legs are mounted to the trailer with the indicia of both the first and second legs facing in the same relative direction. Once mounted the first and second legs must be connected. Each leg is then placed in the completely retracted condition. The connecting member 36 is then installed. The connecting member has a pair of holes located in a first end and a longitudinally extending slot located in a second end. The pair of holes is located adjacent the first end at zero and one hundred and eighty degrees and the slot is located adjacent the second end at zero degrees. The connecting member is sized and configured to encompass the input shafts. The second end of the connecting member is inserted over the second input shaft far enough to allow the first end of the connecting member to be aligned with the first input shaft. The connecting member is retracted partially from the second shaft and inserted over the first input shaft until the pair of holes align with a mounting bore on the first input shaft. A bolt is placed through the pair of holes and the mounting bore and a nut secures the connecting member to the first input shaft. The second input shaft is adjusted if necessary to align the slot with the mounting bore of the second input shaft. A drill inserted through the slot and the mounting bore creates a hole in the connecting member opposite the slot and aligned with the mounting bore. A nut and bolt secure the connecting member to the second input shaft. The connecting member translates rotation and axial movement from one of the first and second input shafts to the other.

After the landing gear has been mounted to a trailer and the connecting member has been installed, the landing gear assembly is ready to be operated. With the connecting member installed, the input shafts and the connecting member function as a single shaft extending from outside the first leg, through the first leg and across and through to the outside of the second leg. A crank is attached to the single shaft on the appropriate side depending on the mounting position (i.e. curbside or roadside). An operator then turns the crank in a first direction to extend the extension members and a second opposite direction to retract the extension members.

To operate the landing gear assembly in high gear, the crank is moved axially towards the leg. This moves the single shaft axially towards the leg such that the shift key in each leg engages the high gear portion in each leg. Rotation of the crank causes the single shaft to engage the high gear portion of the gear mechanism in each leg such that the extension member in each leg is extended or retracted.

To operate the landing gear assembly in low gear, the crank is moved axially away from the leg. This moves the single shaft axially such that the shift key in each leg engages the low gear portion in each leg. Rotation of the crank causes the single shaft to engage the low gear portion of the gear mechanism in each leg such that the extension member in each leg is extended or retracted.

In high gear, each leg extends or retracts a greater distance per revolution of the shaft than in low gear. The effect being that if the connecting member rotates at a set rate about its axis, the legs will extend or retract a greater distance per revolution when the legs are in high gear than when the legs are in low gear.5

When necessary, the crank can be attached on the other side (from the side described above) of the mounted landing gear assembly. In this configuration, rotation of the single shaft in the first direction will retract the lower members of each leg and rotation of the single shaft in the opposite direction will extend the lower members of each leg. Axial movement of the single shaft away from the leg engages the shift key in each leg with the high gear portion of the gear mechanism in each leg. Axial movement of the single shaft away from the leg engages the shift key in each leg with the low gear portion of the gear mechanism in each leg.

The landing gear assembly may be used with a variety of types of trailers. For example, the landing gear assembly may be used with a semi-trailer. The semi-trailer could be a flat bed trailer or a box type trailer. A single leg could be used with a goose neck trailer or a smaller utility trailer. A manufacturer making many different types of trailer could equip all these trailers using the landing gear assembly of the present invention reducing the inventory needs of the manufacturer. In addition, the singular configuration of the first and second legs simplifies the production of the landing gear assembly.

In the embodiment shown, the housing and the extension member are substantially rectangular in shape and the connecting member is cylindrical in shape. However, it is to be understood that other shapes and configurations may be employed without departing from this invention.

As various changes could be made in the above constructions and methods without departing from the scope of the invention, it is intended that all matter contained in the above description or shown in the accompanying drawings shall be interpreted as illustrative and not in a limiting sense. Thus, the breadth and scope of the present invention should not be limited by any of the above-described exemplary embodiments, but should be defined only in accordance with the following claims appended hereto and their equivalents.

What is claimed is:

1. A landing gear assembly for supporting a trailer, the landing gear assembly comprising:
   a housing;
   a means for connecting the housing to a trailer;
   a leg extension mounted on the housing for movement between an extended position and a retracted position of the leg extension relative to the housing, the leg extension having an externally threaded screw that is rotated to cause the movement of the leg extension;
   a gear mechanism operatively connected to the leg extension screw to cause the leg extension to move between the extended and retracted positions in response to operation of the gear mechanism and rotation of the leg extension screw;
   an input shaft mounted for rotation on the housing, the input shaft having a first end outside the housing that is adapted to be operatively connected to a hand crank and a second end outside the housing that is adapted to be operatively connected to a second gear mechanism of a second housing;
   an input gear mounted on the input shaft;
   an idler shaft mounted on the housing; and,
   an idler gear mounted for rotation on the idler shaft, the idler gear being operatively connected between the input gear and the gear mechanism to cause operation of the gear mechanism in response to rotation of the input shaft, and the leg extension screw, the input shaft, and the idler shaft all being positioned in a single vertical plane inside the housing.

2. A landing gear assembly for supporting a trailer, the landing gear assembly comprising:
   a housing enclosing an interior volume and separating the interior volume from an exterior environment of the landing gear assembly;
   a means for connecting the housing to a trailer;
   a leg extension mounted on the housing for movement between an extended position and a retracted position of the leg extension relative to the housing;
   a gear mechanism operatively connected to the leg extension to cause the leg extension to move between the extended and retracted positions in response to operation of the gear mechanism;
   an input shaft mounted for rotation on the housing, the input shaft extending entirely through the housing and having opposite first and second ends positioned outside the housing in the exterior environment of the landing gear assembly;
   an input gear mounted on the input shaft in the housing interior volume;
   an idler shaft mounted on the housing, the idler shaft being fixed against rotation on the housing and having opposite first and second ends that are positioned outside the housing in the exterior environment of the landing gear assembly;
   an idler gear mounted for rotation on the idler shaft, the idler gear being operatively connected between the input gear and the gear mechanism to cause operation of the gear mechanism in response to rotation of the input shaft;
   the idler shaft being fixed against rotation on the housing.

3. The apparatus of claim 2, further comprising:
   the input shaft and the idler shaft being parallel.

4. The apparatus of claim 3, further comprising:
   the input gear being one of a pair of input gears mounted on the input shaft; and,
   the idler gear being one of a pair of idler gears mounted for rotation on the idler shaft.

5. The apparatus of claim 4, further comprising:
   the gear mechanism, the input gear, and the idler gear all being contained inside the housing.

6. The apparatus of claim 1, further comprising:
   the gear mechanism, the input gear, and the idler gear all being contained inside the housing.

7. A landing gear assembly for supporting a trailer, the landing gear assembly comprising:
   a housing;
   a means for connecting the housing to a trailer;
   a leg extension mounted on the housing for movement between an extended position and a retracted position of the leg extension relative to the housing, the leg extension having an externally threaded screw that is rotated to cause the movement of the leg extension;
   a gear mechanism operatively connected to the leg extension screw for causing the leg extension to move between the extended position and the retracted position in response to operation of the gear mechanism;
   an input shaft mounted for rotation on the housing, the input shaft having a first end outside the housing that is adapted to be operatively connected to a hand crank and a second end outside the housing that is adapted to be operatively connected to a second gear mechanism of a second housing;
   an input gear mounted on the input shaft;
   an idler shaft mounted on the housing, the leg extension screw, the input shaft, and the idler shaft all being positioned in a single vertical plane inside the housing; and,
   a pair of unitary idler gears mounted for rotation on the idler shaft, the pair of idler gears being separately operatively driven by rotation of the input shaft and operatively driving the gear mechanism to cause operation of the gear mechanism in response to rotation of the input shaft.

8. The apparatus of claim 7, further comprising:
   the idler shaft being fixed against rotation relative to the housing.

9. The apparatus of claim 8, further comprising:
   the input shaft and the idler shaft being parallel.

10. The apparatus of claim 9, further comprising:
    the input gear being one of a pair of input gears that engage with the pair of idler gears.

11. The apparatus of claim 10, further comprising:
    the gear mechanism, the input gear, and the pair of idler gears all being contained inside the housing.

12. The apparatus of claim 7, further comprising:
the gear mechanism, the input gear, and the pair of idler gears all being contained inside the housing.

13. A landing gear assembly for supporting a trailer, the landing gear assembly comprising:
a housing;
a means for connecting the housing to a trailer;
a leg extension mounted on the housing for movement between an extended position and a retracted position of the leg extension relative to the housing, the leg extension having an externally threaded screw that is rotated to cause movement of the leg extension;
a gear mechanism operatively connected to the leg extension screw for causing the leg extension to move between the extended position and the retracted position relative to the housing in response to operation of the gear mechanism;
an input shaft mounted for rotation on the housing, the input shaft having a first end outside the housing that is adapted to be operatively connected to a hand crank and a second end outside the housing that is adapted to be operatively connected to a second gear mechanism of a second housing;
a low input gear mounted on the input shaft;
a high input gear mounted on the input shaft;
an idler shaft mounted on the housing, the leg extension screw, the input shaft, and the idler shaft all being positioned in a single vertical plane inside the housing; and,
an idler gear mounted for rotation on the idler shaft, the idler gear being operatively connected between a selected one of the low input gear and the high input gear and the gear mechanism to cause operation of the gear mechanism in response to rotation of the input shaft.

14. The apparatus of claim 13, further comprising:
the idler shaft being fixed against rotation on the housing.

15. The apparatus of claim 14, further comprising:
the input shaft and the idler shaft being parallel.

16. The apparatus of claim 15, further comprising:
the idler gear being one of a pair of idler gears that are mounted for rotation on the idler shaft.

17. The apparatus of claim 16, further comprising:
the gear mechanism, the low and high input gears, and the pair of idler gears all being contained inside the housing.

18. The apparatus of claim 13, further comprising:
the gear mechanism, the low and high input gears, and the idler gear all being contained inside the housing.

* * * * *